US012327678B2

(12) United States Patent
Thompson et al.

(10) Patent No.: US 12,327,678 B2
(45) Date of Patent: Jun. 10, 2025

(54) METHOD AND SYSTEMS FOR UNIFORM DISTRIBUTION OF ADDITIVE DOMAINS IN THE GRAIN BOUNDARY OF MAGNETS

(71) Applicant: GM Global Technology Operations LLC, Detroit, MI (US)

(72) Inventors: Margarita P. Thompson, Livonia, MI (US); Wenying Yang, Rochester Hills, MI (US); Edward L. Kaiser, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 18/472,458

(22) Filed: Sep. 22, 2023

(65) Prior Publication Data
US 2025/0104909 A1 Mar. 27, 2025

(51) Int. Cl.
*H01F 41/02* (2006.01)
*B22F 1/05* (2022.01)
(Continued)

(52) U.S. Cl.
CPC ............ *H01F 41/0253* (2013.01); *B22F 1/05* (2022.01); *B22F 1/14* (2022.01); *B22F 3/02* (2013.01); *H01F 1/0571* (2013.01); *H02K 1/02* (2013.01); *B22F 2201/10* (2013.01); *B22F 2202/05* (2013.01); *B22F 2304/10* (2013.01); *B22F 2998/10* (2013.01)

(58) Field of Classification Search
CPC .. H01F 41/0253; H01F 1/0571; H01F 1/0577; H01F 41/0293; B22F 1/05; B22F 1/14; B22F 3/02; B22F 2201/10; B22F 2202/05; B22F 2304/10; B22F 2998/10; B22F 9/04; B22F 2009/044; B22F 2999/00; H02K 1/02
See application file for complete search history.

(56) References Cited

U.S. PATENT DOCUMENTS

2016/0225522 A1\* 8/2016 Zakotnik ................... B22F 3/16
2023/0231428 A1 7/2023 Gong

FOREIGN PATENT DOCUMENTS

JP 2006286859 A 10/2006

OTHER PUBLICATIONS

Tripathy et al., One-step manufacturing process for neodymium-iron (magnet-grade) master alloy, Materials Science for Energy Technologies, 2021, pp. 249-255, vol. 4, ScienceDirect.

\* cited by examiner

*Primary Examiner* — Rebecca Janssen
(74) *Attorney, Agent, or Firm* — Vivacqua Crane, PLLC (57) ABSTRACT

A method of incorporating additive domains in a rare earth magnet, a system for incorporating additive domains in a rare earth magnet, and a traction motor including a rare earth magnet. Inert gas and a plurality of coarse neodymium-iron-boron (NdFeB) particles are introduced into the chamber of a jet mill. The plurality of coarse NdFeB particles impact each other producing a plurality of refined NdFeB particles. The plurality of refined NdFeB particles also impact a target including a target material and transfer a portion of the target material onto a surface of the refined NdFeB particles. The plurality of refined NdFeB particles including the target material are separated from the plurality of coarse NdFeB particles and collected to form a rare earth magnet.

20 Claims, 7 Drawing Sheets

(51) Int. Cl.
*B22F 1/14* (2022.01)
*B22F 3/02* (2006.01)
*H01F 1/057* (2006.01)
*H02K 1/02* (2006.01)

METHOD AND SYSTEMS FOR UNIFORM DISTRIBUTION OF ADDITIVE DOMAINS IN THE GRAIN BOUNDARY OF MAGNETS

INTRODUCTION

Traction motors are used in electric and hybrid-electric vehicles to provide propulsion. Traction motors are powered by electricity stored in the vehicle's battery and convert that power into motion. Traction motors are desirable in applications requiring relatively high power density. In order to achieve desirable power to volume ratios, traction motors use magnets that often include rare-earth metals, such as neodymium-iron-boron (NdFeB) magnets. NdFeB magnets, for example, are selected for use in traction motor applications because of the remanence (Br) exhibited by the NdFEB magnets. As magnets are exposed to external magnetic forces, the magnets may lose their magnetism, particularly at the corners of the magnets and at elevated temperatures.

Coercivity, intrinsic coercivity (Hci, also known as Hcj or iHc) (a measure of the field required to reduce the magnetization of a material to zero) and normal coercivity (Hcb, also known as Hc) (a measure of the magnetic field required to reduce the magnetic flux to zero), of a magnetic material is a measure of the ability of a material to maintain its magnetic characteristics, i.e., magnetism, when exposed to outside magnetic fields. An increase in coercivity (normal or intrinsic) indicates that the material is less apt to lose its magnetic properties at selected temperatures. When losing magnetism, losses typically begin at the grain boundaries. The intrinsic and normal coercivity are mathematically related and not independent of each other.

It has been found that adding additional elements, such as heavy metal rare-earth elements including, for example, dysprosium and terbium, within the grain boundaries of the rare-earth magnets increases coercivity of the magnets, particularly at the operating temperatures of electric motors given the effect of temperature on coercivity. The increase in coercivity reduces the loss in magnetism at the operating temperatures of the electric motor. The additional elements may be incorporated in the grain boundaries which results in using less of the heavy rare earth elements.

However, conventional methods for including the heavy rare earth elements in the grain boundaries use processes such as grain boundary diffusion. In grain boundary diffusion the heavy rare earth element of interest is applied to the surface of a nearly finished magnet by any of several processes such as, for example, surface printing or sputtering, and is then diffused by exposure to high temperature for several hours and up to 24 hours. These processes lead to concentrations of the heavy rare earth elements being localized predominantly at and near the surfaces of the magnets. Further, a layer of the heavy rare earth elements at the very surface of the magnets needs to be removed due to increases in surface roughness which inevitably removes a relatively significant portion of the applied heavy rare earth element.

Accordingly, while rare earth magnets and methods of forming rare earth magnets used in traction motors are adequate to meet their current objectives, there is room for improvement. The present disclosure is directed to systems and methods of uniformly distributing heavy rare earth elements or additional elements in the grain boundaries in a relatively uniform manner throughout the entire volume of rare earth magnets.

SUMMARY

Accordingly to various aspects, the present disclosure relates to a method of incorporating additive domains in a rare earth magnet. The method includes introducing inert gas into a chamber of a jet mill and forming an inert gas stream, introducing a plurality of coarse neodymium-iron-boron (NdFeB) particles into the chamber, agitating the plurality of coarse NdFeB particles with the inert gas stream, and impacting the plurality of coarse NdFeB particles with each other producing a plurality of refined NdFeB particles. The method further includes impacting the plurality of refined NdFeB particles against a target including a target material and transferring a portion of the target material onto a surface of the refined NdFeB particles. The target is at least partially formed of at least one of a metal, a metal alloy, an intermetallic compound, and a ceramic. The method yet further includes separating the plurality of refined NdFEB particles including the target material from the plurality of coarse NdFeB particles, separating the plurality of refined NdFEB particles including the target material from the inert gas stream, and collecting the plurality of refined NdFeB particles including the target material. The plurality of refined NdFeB particles including the target material form a plurality of grains in a magnet and the target material forms an additive domain in the magnet.

In embodiments of the above, the target further includes a core and a coating disposed on the core wherein the coating is formed from the target material. Further, transferring a portion of the target material includes transferring a portion of the coating onto the surface of the refined NdFeB particles. In additional embodiments, transferring a portion of the target material includes transferring a portion of the core onto the surface of the refined NdFeB particles and the core is formed from a different target material from the target material forming the coating.

In any of the above embodiments, the target includes target particles, and impacting the refined NdFeB particles against the target includes impacting the refined NdFeB particles and the coarse NdFeB particles with the target particles. In further embodiments, the target particles exhibit one or more particles sizes in the range of 10 micrometers to 100 micrometers. And, in yet further embodiments, the target particles are larger than the coarse NdFEB particles.

In alternative, or additional, embodiments, the target include baffles connected to the chamber of the jet mill, and impacting the refined NdFeB particles against the target includes impacting the refined NdFEB particles and the coarse NdFEB particles against the baffles.

In further alternative, or additional, embodiments, the target includes a mesh screen connected in a cyclone separator, and impacting the refined NdFeB particles against the target includes impacting the refined NdFEB particles against the mesh screen. In addition, separating the plurality of refined NdFeB particles including the target material from the inert gas stream, and collecting the plurality of refined NdFeB particles including the target material is performed in the cyclone separator.

In any of the above embodiments, the target is at least partially formed of at least one heavy rare earth element. In further embodiments, the target is formed from at least one of terbium and dysprosium. In additional, or alternative, embodiments, the target is at least partially formed of at least one of copper and aluminum.

In any of the above embodiments, the coarse NdFeB particles have one or more particle sizes in a range of 10 micrometers up to 100 micrometers and the refined NdFEB particles have one or more particle sizes in a range of 0.1 micrometers to 10 micrometers.

In any of the above embodiments, the method further includes pressing the refined NdFeB particles including the target material into a rare earth magnet and applying a magnetic field. The method also includes sintering the rare earth magnet and magnetizing the rare earth magnet. The refined NdFEB particles form a plurality of grains, the plurality of grains define a plurality of grain boundaries, and the target material forms additive domains between the grain boundaries.

In embodiments of the above, the plurality of grains exhibit one or more grain sizes in a range of 1 micrometers up to 10 micrometers and the additive domains exhibit one or more domain sizes in a range of 0.1 micrometers up to 10 micrometers.

In further embodiments of the above, the additive domains are present in a range of 0.1 percent to 10 percent by weight of the total weight of the rare earth magnet.

In any of the above embodiments, the weight percentage of the additive domains deviate in any given cubic millimeter less than 10 percent by weight from the average weight of the additive domains per cubic millimeter of the rare earth magnet.

According to several additional aspects, the present disclosure relates to a system for incorporating additive domains in a rare earth magnet. The system includes a jet mill including a chamber, a particle inlet for introducing a plurality of coarse neodymium-iron-boron (NdFeB) particles into the chamber, and a gas inlet for introducing an inert gas stream into the chamber. The inert gas stream agitates the plurality of coarse NdFeB particles to create a plurality of refined NdFeB particles. The system also includes a cyclone collector for removing the plurality of refined NdFeB particles from the inert gas stream and a gas filter included in a gas filtration unit for removing NdFeB fines from the inert gas stream. The system further includes a gas flow path defined between the gas inlet and the gas filter for transferring the refined NdFeB particles and NdFeB fines, and a target including a target material positioned in the gas flow path, wherein the target is at least partially formed from an additive domain material and the refined NdFeB particles impact the target in one of the chamber and the cyclone collector to transfer at least a portion of the target material to a surface of the refined NdFEB particles.

According to various additional aspects, the present disclosure is directed to a traction motor for a vehicle. The traction motor includes a stator, and a rotor. The rotor includes a rare earth magnet, and the rare earth magnet includes: a plurality of grains, a plurality of grain boundaries defined by the grains, and a plurality of additive domains dispersed between the grain boundaries. The plurality of grains include a mixture of neodymium, iron and boron, and the additive domains are present in a range of 0.1 percent to 10 percent by weight of the total weight of the rare earth magnet. In addition, the weight percentage of the additive domains deviate in any given cubic millimeter less than 10 percent by weight from the average weight of the additive domains per cubic millimeter of the rare earth magnet.

In embodiments of the above, the additive domains include at least one of terbium and dysprosium.

In additional or alternative embodiments, the additive domains include at least one of copper and aluminum.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

The present disclosure is related to methods and systems for uniformly distributing additives in the grain boundaries of magnets and, particularly, rare earth magnets. The additives may alter the magnetic properties. For example, the additives may be used to alter the coercivity of the rare earth magnets and, in embodiments, are used to improve the coercivity of the rare earth magnets. The rare-earth magnets include neodymium-iron-boron (NdFeB) magnets, including additives. The rare-earth magnets described herein may be used in a number of applications within a vehicle. For example, the rare-earth magnets may be used in traction motors, heating, ventilation, and air conditioning systems (HVAC systems), transmissions, steering, brakes, window controls, and door controls as well as in sensors.

As used herein, the term "vehicle" is not limited to automobiles. While the present technology is described primarily herein in connection with electric vehicles, the technology is not limited to electric vehicles. The concepts can be used in a wide variety of applications, such as in connection with components used in hybrid-electric vehicles, motorcycles, mopeds, locomotives, aircraft, marine craft, and other vehicles, as well as in other applications utilizing rare-earth magnets.

Figure 1:
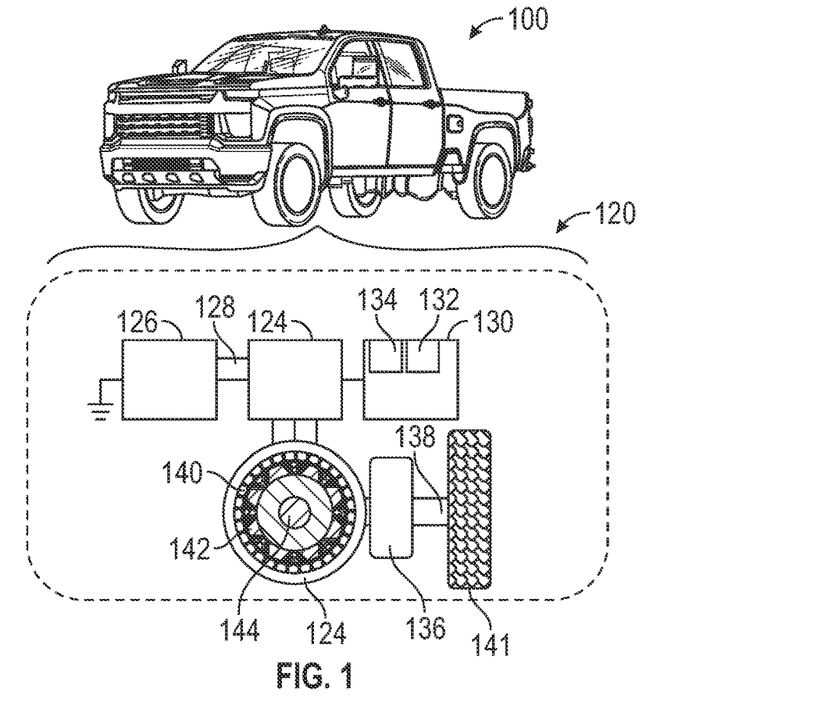
FIG. 1 illustrates an embodiment of a vehicle including a traction motor utilizing rare-earth element magnets, according to embodiments of the present disclosure.

FIG. 1 illustrates a vehicle 100 including rare-earth magnets, as described further herein, for various applications within the vehicle 100. These applications include, but are not limited to, the propulsion system 120. The propulsion system 120 generally includes an electric motor 124 and a battery 126 for powering the electric motor 124. Further, in many embodiments of the propulsion system 120, the propulsion system 120 includes an inverter 128 for changing power from DC (direct current) as provided by the battery 126 to AC (alternating current) as it is used by the electric motor 124. The inverter 128 may be included in a power electronics module, which includes e.g., transistors and diodes, for switching the power from DC to AC and vice-versa.

A controller 130 is connected to the inverter 128 and is programmed to control and manage the operations of the electric motor 124 and associated hardware, including the inverter 128. The electric motor 124 is connected to a transmission (drive unit) 136, and drive line 138, which transfers mechanical power and rotation to the wheels 141 of the vehicle 100. The controller 130 includes one or more one or more processors 132 and tangible, non-transitory memory 134.

Figure 2A:
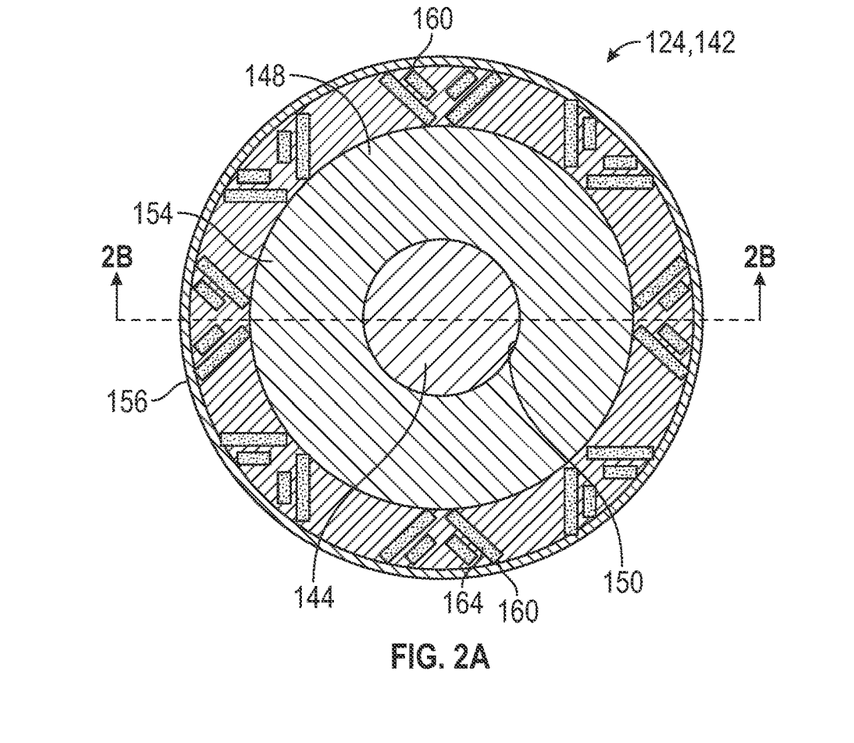
FIG. 2A illustrates an embodiment of a traction motor rotor, including rare-earth element magnets, according to embodiments of the present disclosure.
Figure 2B:
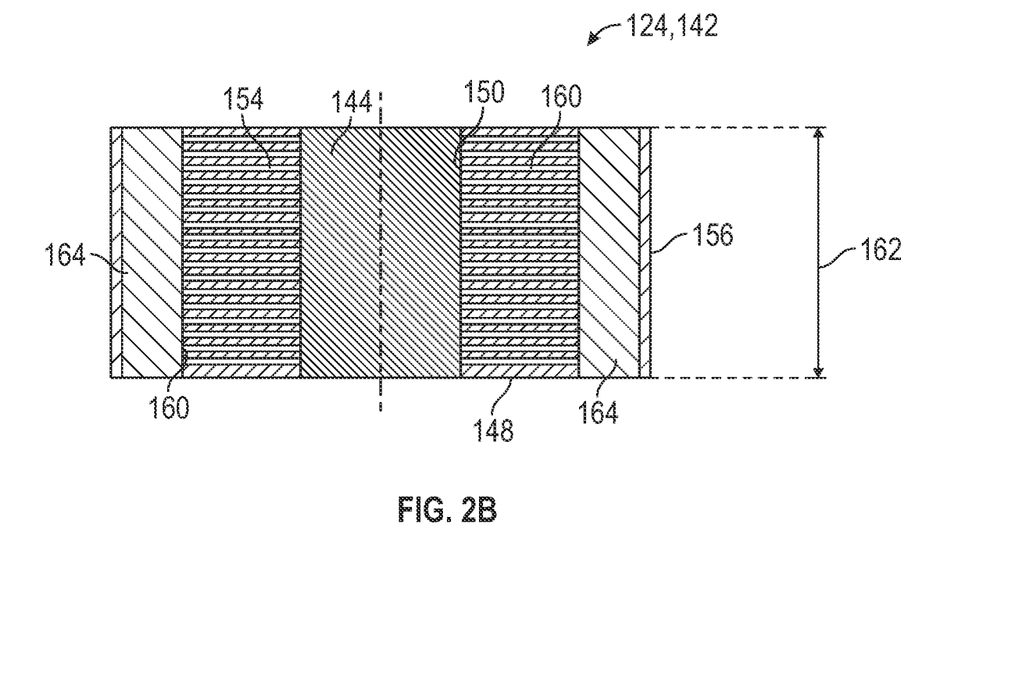
FIG. 2B illustrates an embodiment of a cross-section of the of the traction motor rotor of FIG. 2A, according to embodiments of the present disclosure.

With reference again to the electric motor 124, the electric motor 124 includes a stator 140 and a rotor 142 arranged with the stator 140. The stator 140 is the stationary part of the electric motor 124. The stator 140 provides a rotating magnetic field with which the stationary magnetic field of the rotor 142 tries to align with, causing the rotor 142 to rotate, in what may be referred to as motoring mode. In other applications the rotor's 142 rotating field (as caused by physical rotation) generates an electric current in the stator 140—this mode of operation is referred to as generation and the electric motor 124 used in this way is referred to as generator. In traction motor vehicle applications, the motoring mode provides motion to the vehicle. While the generation mode takes some of the energy recovered from braking when the vehicle is in the process of stopping and stores it back in the vehicle battery. The rotor 142 is arranged on a rotor shaft 144. Reference is made to FIGS. 2A and 2B, which illustrate front and cross-sectional view of an embodiment of a rotor 142. The rotor 142 defines a central aperture 150, which receives the rotor shaft 144. The rotor shaft 144 is connected to the rotor 142 and the transmission 136. The core 148 of the rotor 142 is formed from a series of plates 154 stacked together. The plates 154 may define the outer periphery of the rotor 142 or a sleeve 156 may be disposed over the periphery of the plates 154. Channels 160 are defined in the plates 154 and run at least a portion of the length 162 of the stacked plates 154 and the rare earth magnets 164 are inserted into the channels 160. As illustrated, the channels 160 are arranged in a circumference around the stacked plates 154.

Figure 3A:
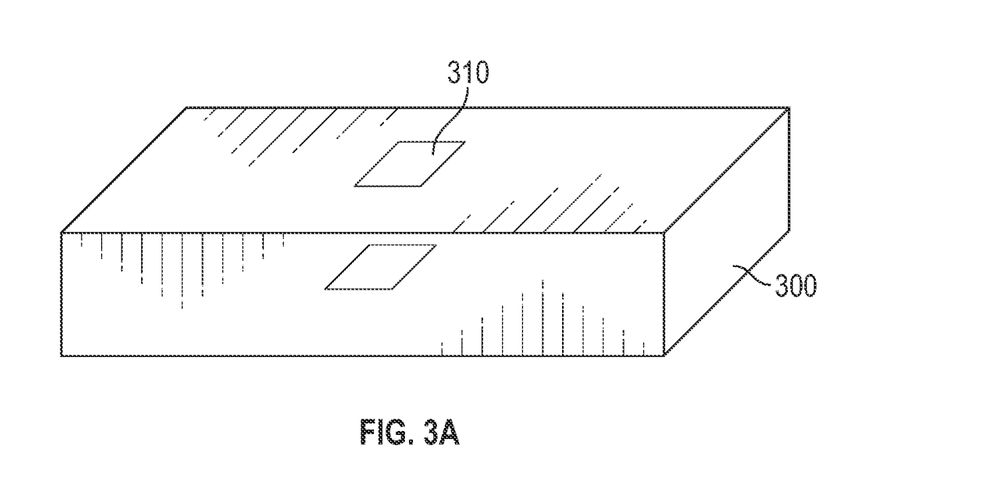
FIG. 3A illustrates an embodiment of a rare-earth magnet, according to embodiments of the present disclosure.
Figure 3B:
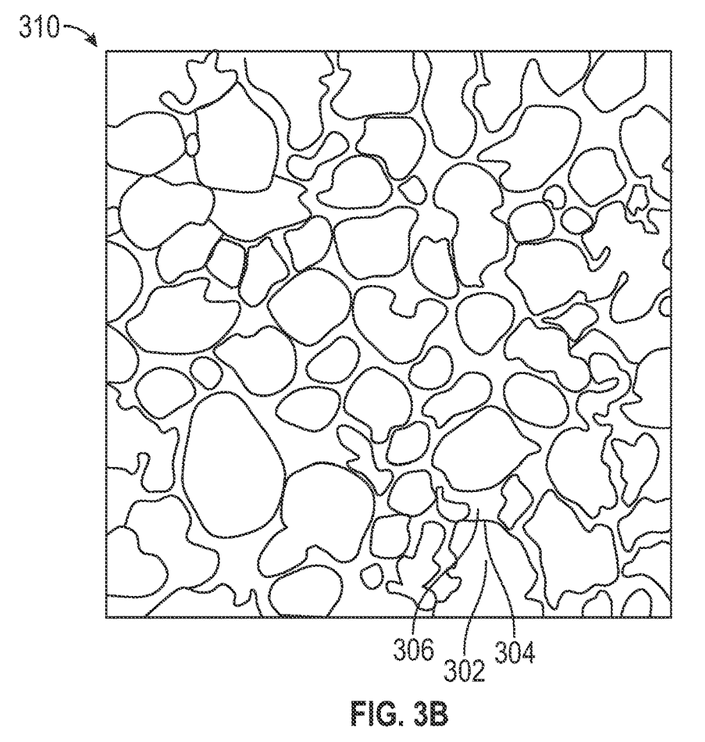
FIG. 3B is an illustration of the grains and additives present in a section of the rare-earth magnet of 3A, according to embodiments of the present disclosure, wherein the scale is 10 micrometers.

The rare earth magnets include neodymium-iron-boron (NdFeB) magnets. Reference is made to FIGS. 3A and 3B, which illustrates an embodiment of a section 310 of a rare earth magnet 300 and an illustration of the material composition of the rare earth magnet 300. While a rectangular, cuboid magnet 300 is illustrated, the rare earth magnet 300 may assume any shape. The rare earth magnet 300 includes a plurality of grains 302, wherein the grains 302 include a mixture of neodymium, iron, and boron. In embodiments, the composition of the neodymium, iron, and boron is $Nd_2Fe_{14}B$. In addition, there may be other elements present in the NdFeB structure, such as cobalt, aluminum, and praseodymium. which are used to modify the properties of the NdFEB magnets. It should be appreciated, the formula $Nd_2Fe_{14}B$ is used to refer to the crystalline material that does not include added elements, while reference to NdFeB implies that there may be other elements present in the basic $Nd_2Fe_{14}B$ structure. Grains are understood herein as distinct crystalline structures, also referred to as crystallites, wherein each grain includes a combination of neodymium, iron, and boron and other elements such as praseodymium, cobalt, aluminum, dysprosium, and terbium. In embodiments, the grains 302 exhibit one or more grain sizes in the range of 0.1 micrometer up to 10 micrometers, including all values and ranges therein.

Between the grains boundaries 304 of neodymium-iron-boron grains 302 there is a generally amorphous, neodymium-rich phase present. In embodiments, the additive domains 306 includes at least one of terbium and dysprosium in the grain boundary phase. Alternatively, or additionally, the additive domains 306 include at least one of another heavy rare earth element, a transition metal element, a basic metal element, and a metalloid. The other heavy rare earth element includes at least one of lanthanum, cerium, praseodymium, samarium, europium, scandium, yttrium, gadolinium, holmium, erbium, thulium, ytterbium, and lutetium. The transition metal element includes one or more of the elements of Groups 4 through 12 and periods 4 through 7 of the periodic table. The basic metal element (also referred to as a post-transition metal) includes one or more of aluminum, copper, gallium, indium, tin, thallium, lead, and bismuth. The metalloid includes one or more of boron, silicon, germanium, arsenic, antimony, tellurium, and polonium. Further, alloys of the above referenced materials may be included in the additive domains 306. In additional or alternative embodiments, the additive domains 306 increases the coercivity of the rare earth magnet to a value that is relatively higher than that of the rare earth magnet without the additive domains 306 at temperatures of up to 200 degrees Celsius. Increases in coercivity of up to 20 percent may be seen with the additions of terbium and dysprosium in the NdFeB magnets.

As noted above, the NdFeB grains 302 individually exhibit a size (measured along the longest linear dimension) of 0.1 micrometer up to 10 micrometers, including all values and ranges therein. The additive domains 306 present in the grain boundary amorphous phase exhibit a domain size (largest linear dimension) in the range of 0.5 nm to 10 micrometer in size, including all values and increments therein. The additive domains 306 are present in a range of 0.1 percent to 10 percent by weight of the total weight of the magnet 300, including all values and ranges therein, such as from 0.2 weight percent to 0.7 weight percent. In addition, the additive domains 306 are present in a relatively uniform amount throughout the magnet volume, wherein the weight percentage of the additive domains 306 deviates in any given cubic millimeter less than 10 percent by weight from the average weight of the additive domains 306 per cubic millimeter in the magnet.

Figure 4:
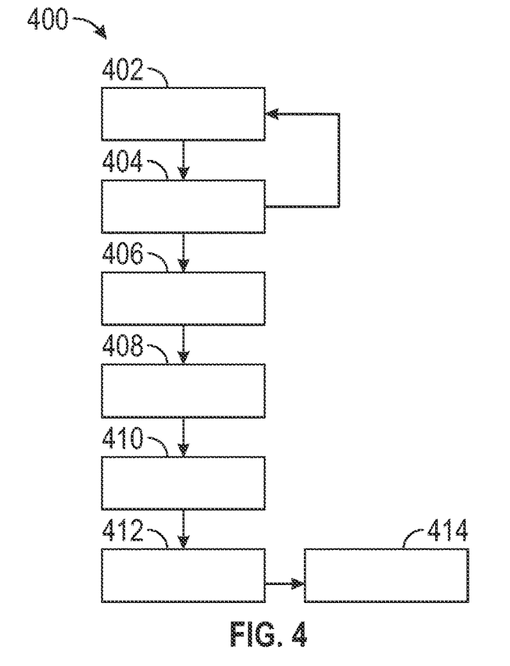
FIG. 4 illustrates an embodiment of a method of forming a rare-earth magnet including additives incorporated in the grain boundaries, according to embodiments of the present disclosure.
Figure 5A:
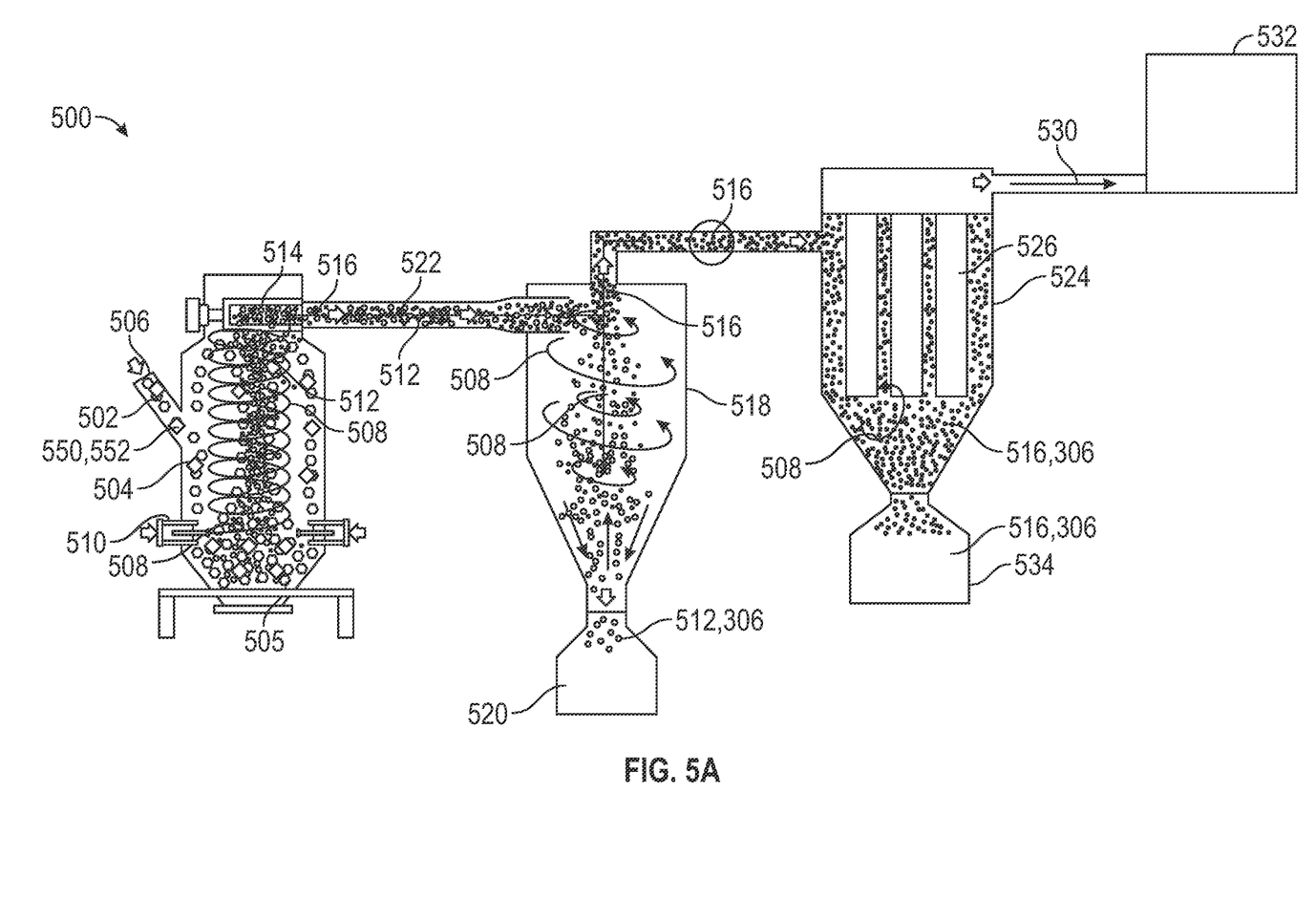
FIG. 5A illustrates an embodiment of a jet mill system including target particles, according to embodiments of the present disclosure.
Figure 5B:
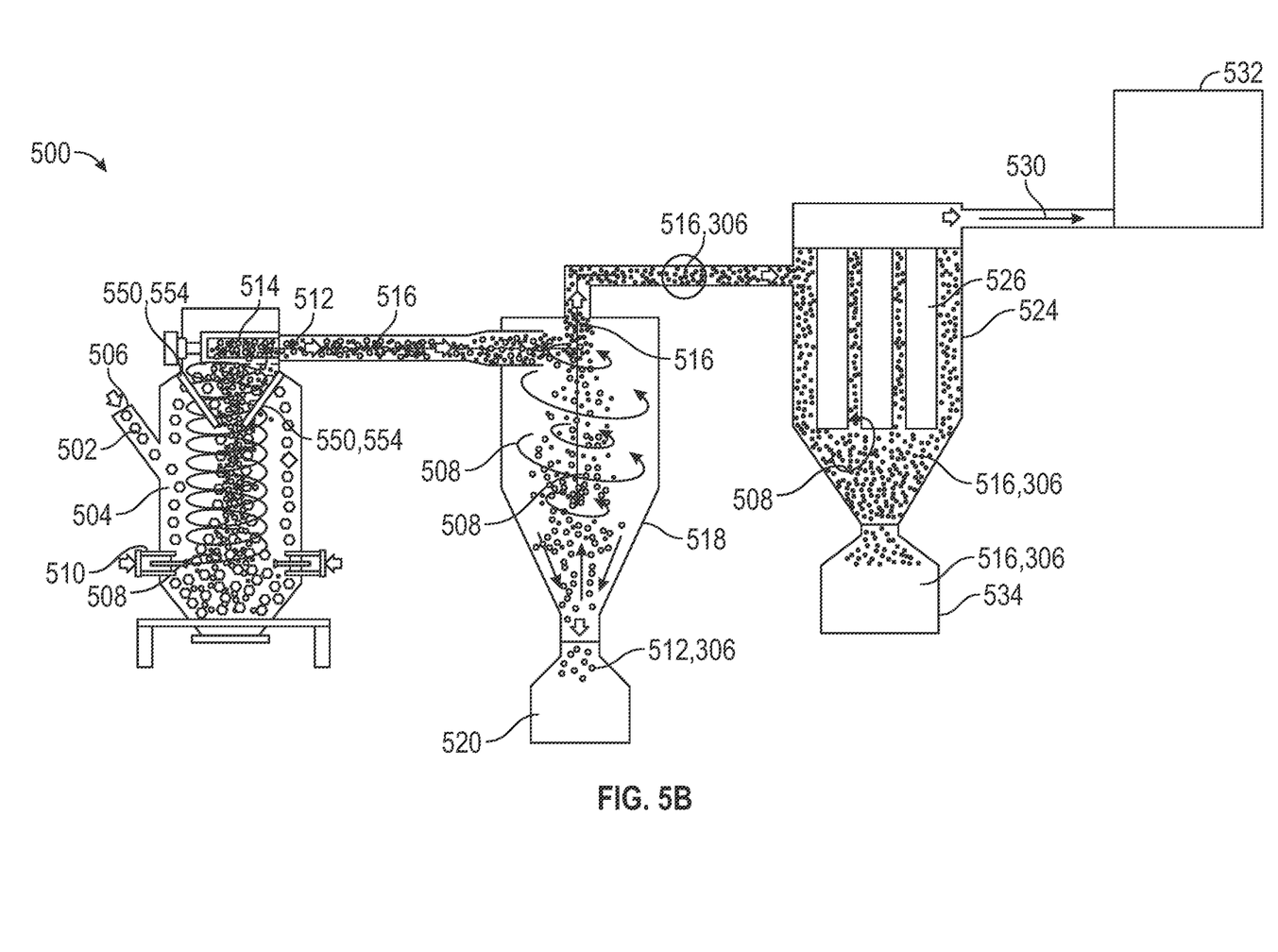
FIG. 5B illustrates an embodiment of a jet mill system including target plates, according to embodiments of the present disclosure.
Figure 5C:
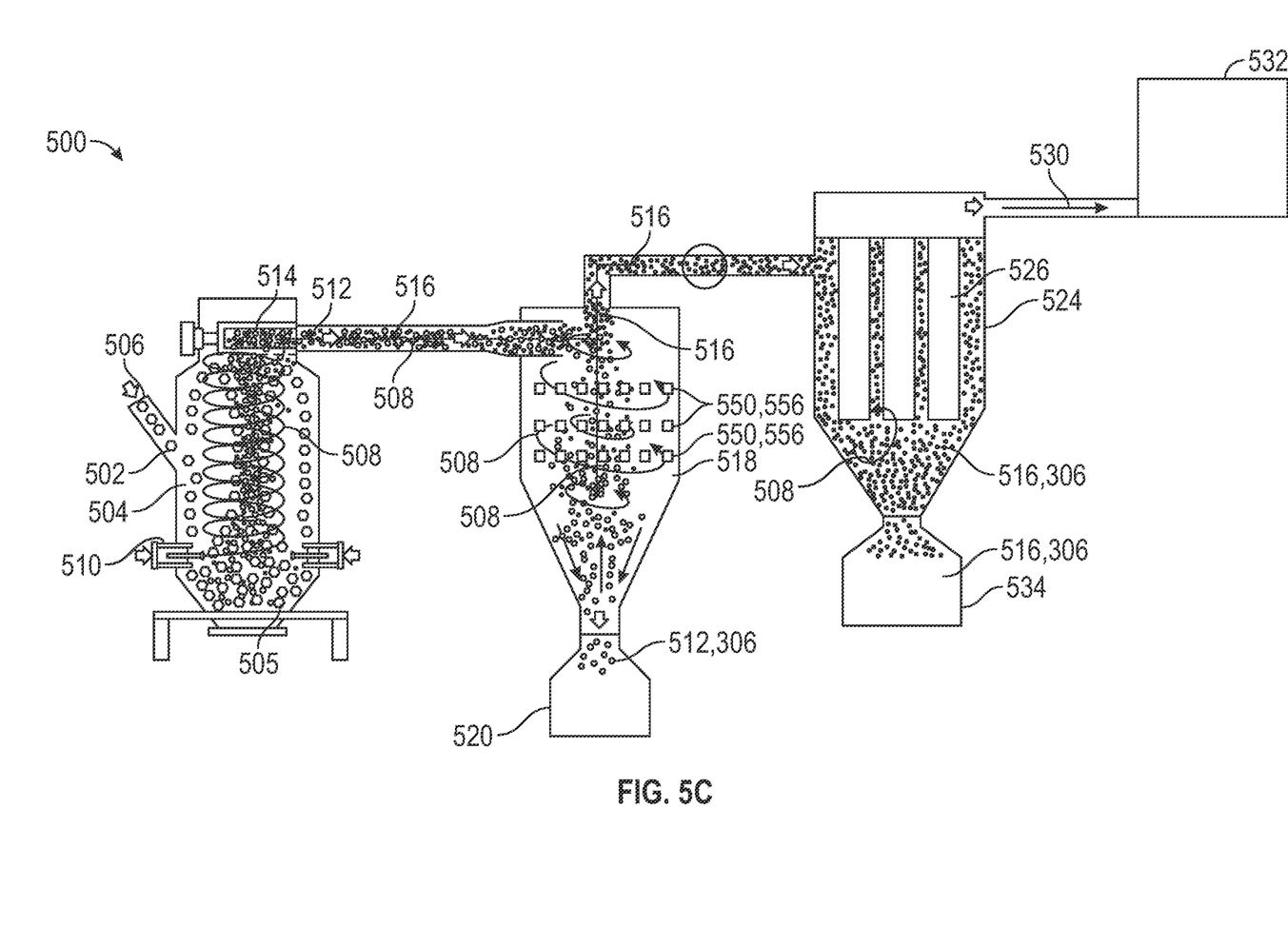
FIG. 5C illustrates an embodiment of a jet mill system including target mesh, according to embodiments of the present disclosure.

Turning now to FIG. 4, and with reference to FIGS. 3A, 3B, 5A, 5B, and 5C, a method 400 for distributing the additive domains 306 between the grain boundaries 304 in rare earth magnets 300, uniformly through the magnet volume, is illustrated. FIGS. 5A, 5B, 5C illustrate embodiments of a jet milling system 500 for use in the methods described with reference to FIG. 4. The materials used to create the additive domains 306, noted above, are added to the coarse NdFEB particles 502 and refined NdFeB particles 512 using one or more targets 550, 550', 550" provided in the inert gas stream 508 of the jet milling system 500.

As alluded to above, the targets 550, 550', 550" are at least partially formed from the materials that form the additive domains 306. For example, the materials that form the additive domains 306 (also referred to as the target material) may coat the targets 550, 550', 550" or the targets 550, 550', 550" may be formed completely of the material forming the additive domains 306. In addition, multiple targets 550, 550', 550" may be provided, each including a different material for forming the additive domains 306.

As alluded to above, each target 550, 550', 550" includes a target material including at least one of a metal, a metal alloy, an intermetallic compound, and a ceramic. In embodiments, the target 550, 550', 550" includes at least one of terbium and dysprosium. Alternatively, or additionally, the target 550, 550', 550" includes at least one of another heavy rare earth element, a transition metal element, a basic metal element, and a metalloid. The other heavy rare earth element includes at least one of lanthanum, cerium, praseodymium, samarium, europium, scandium, yttrium, gadolinium, holmium, erbium, thulium, ytterbium, and lutetium. The transition metal element includes one or more of the elements of Groups 4 through 12 and periods 4 through 7 of the periodic table. The basic metal element (also referred to as a post-transition metal) includes one or more of aluminum, gallium, indium, tin, thallium, lead, and bismuth. The metalloid includes one or more of boron, silicon, germanium, arsenic, antimony, tellurium, and polonium. Further, alloys of the above referenced materials may be included in the target.

Figure 6:
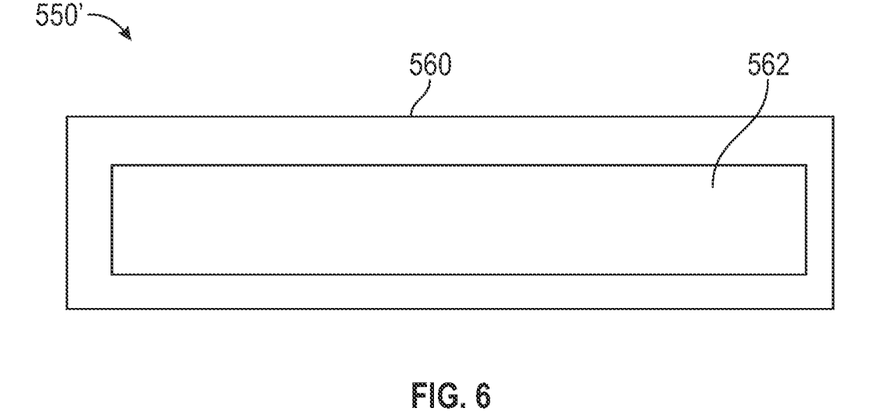
FIG. 6 illustrates an embodiment of a target, in this case a baffle, including multiple layers of material, according to embodiments of the present disclosure.

In further embodiments, as illustrated in FIG. 6 and previously noted, the baffle target 550' of FIG. 5B, for example, may also include a coating 560 disposed on a core 562 of the target 550'. The coating 560 is formed from one of the above recited target materials and the core 562 is formed from one of the above recited target materials or another material. It should be appreciated that more than one coating 560 may be present, wherein the coatings 560 are layered over each other or on different portions of the target 550'. While the baffle target 550' of FIG. 5B is illustrated, it should be appreciated that any of the other conformations of the target 550, 550" of FIGS. 5A and 5C may also include a core and one or more coating layers.

The method 400 generally includes introducing at block 402 coarse NdFeB particles 502 of neodymium, iron, and boron into the chamber 505 of a jet mill 504 through a particle inlet 506. In the chamber 505 of the jet mill 504 the size of the coarse NdFeB particles 502 is reduced. The coarse NdFeB particles 502 are introduced into the chamber 505 exhibiting one or more particles size of greater than 10.0 micrometers and up to 100 micrometers, including all values and ranges therein.

A stream of inert gas (inert gas stream) 508 is also introduced under pressure through one or more gas inlets 510. The inert gas includes, for example, one of argon, xenon, and nitrogen. In embodiments, gas inlet 510, includes a gas jet, which is configured to introduce the inert gas stream 508 from a gas source at a pressure in the range of 0.34 megapascals (MPa) (50 pounds per square inch (psi)) to 1.37 MPa (200 psi), including all values and ranges therein such as 0.68 MPa (100 psi) to 0.86 MPa (125 psi). The gas source may include a pump for pressurizing the gas or gas may be stored under pressure in the gas source. Further, in embodiments, a flow regulator or a flow meter may be used to deliver the gas at a constant feed rate. The inert gas stream 508 flows between the gas inlet 510 to the gas filtration unit 524, defining a flow path of the various particles through the jet milling system 500. During jet milling, the inert gas stream 508 entrains and agitates the coarse NdFeB particles 502 causing the coarse NdFEB particles 502 to impact and collide with each other, reducing the size of the coarse NdFeB particles 502, creating refined NdFeB particles 512 and fines 516. The refined NdFeB particles exhibit relatively smaller particle sizes than the coarse NdFeB particles, and the fines exhibit relatively smaller particle sizes than the refined NdFEB particles.

In the embodiments illustrated in FIGS. 5A and 5B, the targets 550, 550' are located in the inert gas stream 508 within the jet milling chamber 505 and are impacted by the coarse NdFeB particles 502, refined NdFeB particles 512, and fines 516. A portion of the target material is transferred to the surfaces of the refined NdFeB particles 512 as well as the surfaces of coarse NdFeB particles 502 that impact the target 550, 550'.

In further embodiments of the above illustrated in FIG. 5A, the target 550 is formed by a plurality of target particles 552 that are circulated in the jet mill 504 by the inert gas stream 508 and may be entrained within the inert gas stream 508. In embodiments, the target particles 552 exhibit one or more particles sizes (as measured in the largest linear dimension for each particle) in the range of 10 micrometers to 100 micrometers, including all values and ranges therein. In further embodiments, the target particles 552 exhibit one or more particle sizes that are relatively larger than that of the coarse NdFeB particles 502. The target particles 552 are introduced with the coarse NdFeB particles 502 into the inert gas stream 508 through the coarse NdFeB particle inlet 506, as illustrated, or through a second inlet (not illustrated).

In alternative or additional embodiments, illustrated in FIG. 5B, the target 550' is provided as one or more baffles 554 positioned affixed in the jet mill 504 chamber 505 in the inert gas stream 508. While two baffles 554 are illustrated as being affixed on either side of the milling chamber 505 near the top of the milling chamber 505 in FIG. 5B, it should be appreciated that the one or more baffles 554 providing the target 550' may be affixed in any location of the milling chamber 505 located in the inert gas stream 508, including in the center of the milling chamber 505. Further, the baffles 554, while being illustrated as a cuboid in shape with a rectangular cross section, may exhibit the shape of a truncated cone or one or more rods or an arcuate geometry. Coarse NdFEB particles 502 and refined NdFeB particles 512, as well as the fines 516, impact the baffle 554 while circulating in the jet mill 504 transferring the target 550' material to the coarse NdFeB particles 502 and refined NdFEB particles 512.

At block 404, the refined NdFeB particles 512 including the target material, which may be present, and fines 516 are separated from the coarse NdFeB particles 502 in the inert gas stream 508 using a size separator 514. In embodiments, the size separator 514 includes a classifying rotor, positioned at the top of the jet mill 504, to separate the refined NdFEB particles 512 and fines 516 from the coarse NdFeB particles 502. The refined NdFeB particles 512 exhibit one or more particle sizes (determined by the largest linear dimension) in the range of 1 micrometers in size to 10 micrometers, including all values and ranges therein, and fines 516 exhibit one or more particles sizes (determined by the largest linear dimension) in the range of 1 nanometer to less than 1 micrometers. The target material transferred to the refined NdFeB particles 512, if present, exhibit one or more particle sizes (determined by the largest linear dimension) in the range of 1 nanometer in size to 1 micrometers, including all values and ranges therein. Coarse NdFEB particles 502 and target particles 550, 552, exhibiting one or more particle sizes greater than 5 micrometers, remain in, or are transferred back into, the jet mill 504 and are milled again at block 402.

At block 406, the refined NdFEB particles 512 and fines 516 are transferred by the inert gas stream 508 into a cyclone separator 518. In additional or alternative embodiments to adding the target 550, 550' in the jet mill 504, a target 550" may be added in the cyclone separator 518 in the inert gas stream 508 as described further below with reference to FIG. 5C. The target 550" is impacted by the refined NdFeB particles 512 and fines 516, fragmenting material off the target 550" and transferring material onto surfaces of the refined NdFeB particles 512. The refined NdFeB particles 512 are separated from the inert gas stream 508 and fall to the bottom of the cyclone separator 518 into a collection container 520.

Turning now to FIG. 5C, the target 550" is provided as one or more mesh screens 556 in the cyclone collector 518 in the inert gas stream 508. It is noted that three mesh screens 556 are illustrated. Refined NdFEB particles 512, as well as the fines 516, impact the target 550" while circulating in the cyclone collector 518. Upon impact, a portion of the target material is transferred to the surface of the refined NdFeB particle 512, or fine 516, prior to separation of the refined NdFeB particles 512 from the inert gas stream 508.

At block 408 the fines 516 are carried to a gas filtration unit 524, which cleans the fines 516 out of the stream of inert gas 508 using one or more filters 526. The cleaned inert gas 530 from the inert gas stream 508 is recirculated to a compressor 532 and the fines 516 are collected in the filters 526 and a fines collection container 534. The fines 516 may be remelted and formed again into coarse particles 502.

At block 410, the refined NdFeB particles 512 including the target material are then pressed into a rare earth magnet 300. The refined NdFeB particles 112 form the grains 302 of the magnet 300 and the target material transferred onto the surfaces of the refined NdFeB particles 112 form the additive domains 306 located between the grain boundaries 304 of the grains 302. Pressing includes applying pressure to the refined NdFeB particles 512 with the additive 306 in one or more axis. While applying pressure, a magnetic field is applied, which orients the direction of the magnetic field of each particle in the magnet 300. Pressure may be applied in one of the following orientations: aligned in the direction of magnetization, traverse to the direction of magnetization, and isostatically in all directions regardless of the direction of magnetization. Further, in embodiments, the magnet may be pressed multiple times, each time in any one or more of the orientations noted above. Then, at block 412, the magnet 300 is sintered and optionally machined and coated. At block 414, the magnet 300 is magnetized to align the magnetic domains in the same direction through the application of a voltage in a magnetizing coil the magnet 300 is placed into.

In embodiments of the above, prior to introduction into the jet mill 504 at block 402, the coarse NdFeB particles 502 may be formed by melting neodymium, iron, and boron together in a furnace. In alternative embodiments, the melt may be formed from a reaction product of neodymium, boron, iron, iron oxide ($Fe_2O_3$), neodymium oxide ($Nd_2O_3$), and calcium (Ca), which are provided to the furnace. The furnace may be a vacuum furnace heated by, e.g., induction heating. The molten metal is then solidified into particles using a solidification process, such as strip casting (also referred to as melt spinning) or atomization. The particles are flake shaped. Alternatively, the particles may be spherical. However, it should be appreciated that the coarse NdFeB particles 502 may be sourced from a supplier.

The methods and systems herein offer a number of advantages. These advantages include, for example, relatively uniform incorporation of additive domains throughout the volume of the magnet. Further advantages include the elimination of post processing steps, such as diffusion and screen printing to form the additive domains. In addition, the resulting coercivity may be greater than the coercivity exhibited by magnets 300 formed using the diffusion and screen printing process noted above when utilizing materials such as terbium and dysprosium. Further, the amount of heavy rare-earth elements, such as terbium and dysprosium, used to form the additive domains 306 may be reduced, particularly as compared to diffusion processes and processes incorporating the heavy rare-earth elements into the neodymium, iron and boron grains. In addition, the methods and systems described herein allow for the facile incorporation of multiple non-rare earth elements for experimental purposes to determine which one influences the magnetic properties in desirable ways.

As used herein, the term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The vehicle controller 130 may also consist of multiple controllers which are in electrical communication with each other. The vehicle controller 130 may be inter-connected with additional systems and/or controllers of the vehicle 100, allowing the vehicle controller 130 to access data such as, for example, speed, acceleration, braking, and steering angle of the vehicle 100.

A processor may be a custom made or commercially available processor, a central processing unit (CPU), a graphics processing unit (GPU), an auxiliary processor among several processors associated with the controller 130, a semiconductor-based microprocessor (in the form of a microchip or chip set), a macroprocessor, a combination thereof, or generally a device for executing instructions.

The tangible, non-transitory memory 134 may include volatile and nonvolatile storage in read-only memory (ROM), random-access memory (RAM), and keep-alive memory (KAM), for example. KAM is a persistent or non-volatile memory that may be used to store various operating variables while the processor 132 is powered down. The tangible, non-transitory memory 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 130 to control various systems of the vehicle 100.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of incorporating additive domains in a rare earth magnet, comprising:

introducing inert gas into a chamber of a jet mill and forming an inert gas stream;

introducing a plurality of coarse neodymium-iron-boron (NdFeB) particles into the chamber;

agitating the plurality of coarse NdFeB particles with the inert gas stream;

impacting the plurality of coarse NdFeB particles with each other producing a plurality of refined NdFeB particles;

impacting the plurality of refined NdFeB particles against a target including a target material;

transferring a portion of the target material onto a surface of the refined NdFeB particles, wherein the target is at least partially formed of at least one of a metal, a metal alloy, an intermetallic compound, and a ceramic;

separating the plurality of refined NdFeB particles including the target material from the plurality of coarse NdFeB particles;

separating the plurality of refined NdFeB particles including the target material from the inert gas stream; and collecting the plurality of refined NdFeB particles including the target material, wherein the plurality of refined NdFeB particles including the target material form a plurality of grains in a magnet and the target material forms an additive domain in the magnet.

2. The method of claim 1, wherein the target further includes a core and a coating disposed on the core wherein the coating is formed from the target material, and wherein transferring a portion of the target material includes transferring a portion of the coating onto the surface of the refined NdFeB particles.

3. The method of claim 2, wherein transferring a portion of the target material includes transferring a portion of the core onto the surface of the refined NdFeB particles and the core is formed from a different target material from the target material forming the coating.

4. The method of claim 1, wherein the target includes target particles, and impacting the refined NdFeB particles against the target includes impacting the refined NdFeB particles and the coarse NdFeB particles with the target particles.

5. The method of claim 4, wherein the target particles exhibit one or more particles sizes in the range of 10 micrometers to 100 micrometers.

6. The method of claim 5, wherein the target particles are larger than the coarse NdFeB particles.

7. The method of claim 1, wherein the target include baffles connected to the chamber of the jet mill, and impacting the refined NdFeB particles against the target includes impacting the refined NdFeB particles and the coarse NdFeB particles against the baffles.

8. The method of claim 1, wherein the target includes a mesh screen connected in a cyclone separator, and impacting the refined NdFeB particles against the target includes impacting the refined NdFeB particles against the mesh screen, wherein separating the plurality of refined NdFeB particles including the target material from the inert gas stream, and collecting the plurality of refined NdFeB particles including the target material is performed in the cyclone separator.

9. The method of claim 1, wherein the target is at least partially formed of at least one heavy rare earth element.

10. The method of claim 9, wherein the target is formed from at least one of terbium and dysprosium.

11. The method of claim 1, wherein the target is at least partially formed of at least one of copper and aluminum.

12. The method of claim 1, wherein the coarse NdFeB particles have one or more particle sizes in a range of 10 micrometers up to 100 micrometers and the refined NdFeB particles have one or more particle sizes in a range of 0.1 micrometers to 10 micrometers.

13. The method of claim 12, further comprising pressing the refined NdFeB particles including the target material into a rare earth magnet and applying a magnetic field, wherein the refined NdFeB particles form a plurality of grains, the plurality of grains define a plurality of grain boundaries and the target material forms additive domains between the grain boundaries; sintering the rare earth magnet; and magnetizing the rare earth magnet.

14. The method of claim 13, wherein the plurality of grains exhibit one or more grain sizes in a range of 1 micrometers up to 10 micrometers and the additive domains exhibit one or more domain sizes in a range of 0.1 micrometers up to 10 micrometers.

15. The method of claim 13, wherein the additive domains are present in a range of 0.1 percent to 10 percent by weight of the total weight of the rare earth magnet.

16. The method of claim 13, wherein the weight percentage of the additive domains deviate in any given cubic millimeter less than 10 percent by weight from the average weight of the additive domains per cubic millimeter of the rare earth magnet.

17. The method of claim 1, further comprising, prior to introducing the plurality of coarse NdFeB particles into the chamber, forming the coarse NdFeB particles by melting neodymium, iron, and boron together in a furnace; and solidifying the melt into particles.

18. The method of claim 1, further comprising, prior to introducing the plurality of coarse NdFeB particles into the chamber, forming the coarse NdFeB particles from a reaction product of neodymium, boron, iron, iron oxide, neodymium oxide, and calcium melted in a furnace; and solidifying the melt into particles.

19. The method of claim 1, wherein the NdFeB particles exhibit the following composition: $Nd_2Fe_{14}B$.

20. The method of claim 1, wherein the NdFeB particles further include at least one of praseodymium, cobalt, and aluminum.

* * * * *

UNITED STATES PATENT AND TRADEMARK OFFICE
CERTIFICATE OF CORRECTION

PATENT NO. : 12,327,678 B2  
APPLICATION NO. : 18/472458  
DATED : June 10, 2025  
INVENTOR(S) : Margarita P. Thompson, Wenying Yang and Edward L. Kaiser Page 1 of 1

It is certified that error appears in the above-identified patent and that said Letters Patent is hereby corrected as shown below:

In the Specification

Column 1, Line 15, "NdFEB" should read --NdFeB--.

Column 2, Lines 14, 17, 40, 44, 45, 49, and 63, "NdFEB", each occurrence, should read --NdFeB--.

Column 3, Lines 4 and 43, "NdFEB", each occurrence, should read --NdFeB--.

Column 6, Line 4, "NdFEB" should read --NdFeB--.

Column 7, Line 1, "NdFEB" should read --NdFeB--.

Column 8, Lines 4, 9, 10, 46, 50, and 56, "NdFEB", each occurrence, should read --NdFeB--.

Column 9, Lines 1, 6, and 22, "NdFEB", each occurrence, should read --NdFeB--.

Signed and Sealed this  
Twelfth Day of August, 2025

Coke Morgan Stewart  
*Acting Director of the United States Patent and Trademark Office*